(12) United States Patent
Chen

(10) Patent No.: US 9,645,676 B2
(45) Date of Patent: May 9, 2017

(54) METHODS AND SYSTEMS TO REGENERATE H-SYNC BY A TOUCH CONTROLLER

(71) Applicant: Dell Products, L.P., Round Rock, TX (US)

(72) Inventor: Chung-Jen Chen, Taibei (TW)

(73) Assignee: DELL PRODUCTS, L.P., Round Rock, TX (US)

( * ) Notice: Subject to any disclaimer, the term of this patent is extended or adjusted under 35 U.S.C. 154(b) by 36 days.

(21) Appl. No.: 14/615,055

(22) Filed: Feb. 5, 2015

(65) Prior Publication Data

US 2016/0231859 A1  Aug. 11, 2016

(51) Int. Cl.
| | |
|---|---|
| *G06F 3/041* | (2006.01) |
| *G06F 3/0354* | (2013.01) |
| *G06F 3/038* | (2013.01) |
| *G09G 5/12* | (2006.01) |

(52) U.S. Cl.
CPC ............ *G06F 3/0418* (2013.01); *G06F 3/038* (2013.01); *G06F 3/03545* (2013.01); *G06F 3/0412* (2013.01); *G09G 5/12* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2006/0055680 A1* | 3/2006 | Okazaki | .................. | G06F 3/045 345/173 |
| 2007/0262966 A1* | 11/2007 | Nishimura | .............. | G06F 3/044 345/173 |
| 2009/0167726 A1* | 7/2009 | Sprague | ................ | G06F 3/0317 345/179 |
| 2012/0262390 A1* | 10/2012 | Kida | ....................... | G06F 3/041 345/173 |
| 2015/0062077 A1* | 3/2015 | Kitamura | .............. | G06F 3/0416 345/174 |
| 2015/0091865 A1* | 4/2015 | Funayama | .............. | G06F 3/044 345/174 |

* cited by examiner

*Primary Examiner* — Ilana Spar
*Assistant Examiner* — Henok Heyi
(74) *Attorney, Agent, or Firm* — Norton Rose Fulbright US LLP

(57) ABSTRACT

Methods and systems to regenerate H-sync by a touch controller are described. In an embodiment, a method may include setting, using a processing device, a noise peak threshold for identifying a Horizontal Synchronization (H-Sync) signal generated by a display device. The method may also include determining, using the processing device, a frequency of the noise peaks that exceed the noise peak threshold. Additionally, the method may include selecting, using the processing device, an H-sync signal for regeneration by referencing a lookup table of H-sync signals with reference to the determined frequency of the noise peaks that exceed the noise peak threshold.

20 Claims, 7 Drawing Sheets

METHODS AND SYSTEMS TO REGENERATE H-SYNC BY A TOUCH CONTROLLER

FIELD

This disclosure relates generally to information handling systems, and more specifically, to methods and systems to regenerate H-sync by a touch controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Active digitizer devices, commonly referred to as active pen devices or active stylus devices, are one form of input device that can be used in conjunction with an information handling system. An active digitizer device, such as an active pen, may be used to convert movements of the active digitizer device into digital text, lines, drawings, notes, etc for input into an information handling system. Often, a display device is provided to interact with the active digitizer device. One problem with prior systems is that the Horizontal Synchronization (H-Sync) signal of the display device may create noise that interferes with operation of the active digitizer device. Some solutions to this problem include setting a working period of the active digitizer device to the time period that falls between H-Sync pulses. Unfortunately, prior systems require a priori knowledge of the H-Sync frequency and starting time in order to successfully synchronize the active digitizer device to the H-Sync frequency. Alternatively, coil antennas or wired communication connections between the display device and the active digitizer device may be used to determine the H-Sync period. Unfortunately, such systems require a priori information, additional hardware, or wired tethers between the display device and the active digitizer.

SUMMARY

Methods and systems to regenerate H-sync by a touch controller are described. In an embodiment, a method may include setting, using a processing device, a noise peak threshold for identifying a Horizontal Synchronization (H-Sync) signal generated by a display device. The method may also include determining, using the processing device, a frequency of the noise peaks that exceed the noise peak threshold. Additionally, the method may include selecting, using the processing device, an H-sync signal for regeneration by referencing a lookup table of H-sync signals with reference to the determined frequency of the noise peaks that exceed the noise peak threshold.

In an embodiment, the method may further include receiving noise from the display device with a touch sensor. Additionally, the method may include converting the noise received by the touch sensor into a noise signal.

In an embodiment, the method may include regenerating the selected H-sync signal. In some embodiments, the method may include synchronizing an active pen device with the selected H-sync signal. The method may further include synchronizing the active pen device further comprises determining a working period for the active pen device in response to the selected H-sync signal. Additionally, the method may include synchronizing the active pen device further comprises setting the working period for the active pen device to the time period between H-sync pulses defined by the selected H-sync signal.

An apparatus may include a touch sensor configured to receive noise from a display device. The apparatus may also include a processing device coupled to the touch sensor, the processing device configured to set a noise peak threshold for identifying a Horizontal Synchronization (H-Sync) signal generated by a display device, determine a frequency of the noise peaks that exceed the noise peak threshold, and select an H-sync signal for regeneration by referencing a lookup table of H-sync signals with reference to the determined frequency of the noise peaks that exceed the noise peak threshold.

A system may include a display device having a predetermined Horizontal Synchronization (H-Sync) period, the H-sync comprising a plurality of H-sync pulses. The system may further include an active pen device configured to interact with the display device, the active pen device comprising a touch sensor configured to receive noise from a display device, and a processing device coupled to the touch sensor. The processing device may be configured to set a noise peak threshold for identifying a Horizontal Synchronization (H-Sync) signal generated by a display device, determine a frequency of the noise peaks that exceed the noise peak threshold, and select an H-sync signal for regeneration by referencing a lookup table of H-sync signals with reference to the determined frequency of the noise peaks that exceed the noise peak threshold.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems to regenerate H-sync by a touch controller. In an embodiment, the methods and systems do not require additional hardware, such as wired communication tethers, coil antennas, or the like. Rather, the described embodiments may include identifying a frequency of H-sync peaks detected by the a touch sensor component of the active digitizer device using a threshold on the noise generated by a display device, and then looking up a matching H-sync signal in a lookup table of H-sync signals referenced by the frequency of the detected noise peaks. In such an embodiment, the H-sync signal may be regenerated, and the working period of the active digitizer device may be set to avoid interference from the H-sync pulses accordingly.

Figure 1:
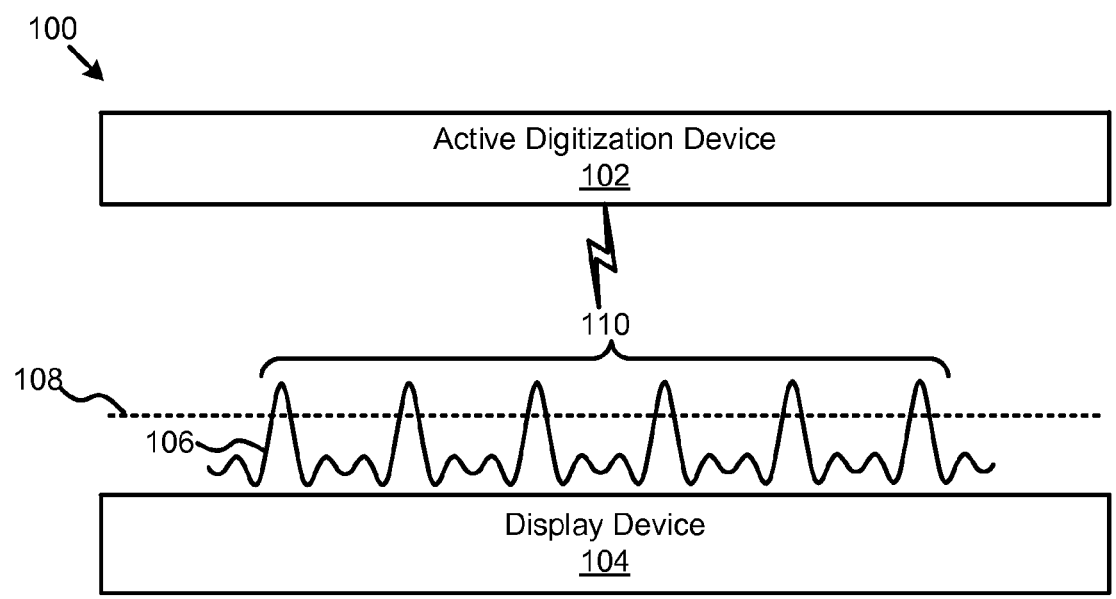
FIG. 1 is a schematic block diagram illustrating one embodiment of a system to regenerate H-sync by a touch controller.

FIG. 1 is a schematic block diagram illustrating one embodiment of a system 100 to regenerate H-sync by a touch controller. In the embodiment of FIG. 1, the system 100 includes an active digitization device 102 and a display device 104. A noise signal 106 may be generated by the display device 104, which may include a plurality of H-sync pulses 110. The H-sync pulses 110 may be identified by the active digitization device 102 by setting a noise threshold 108 and identifying noise peaks that exceed the noise threshold 108.

Figure 2A:
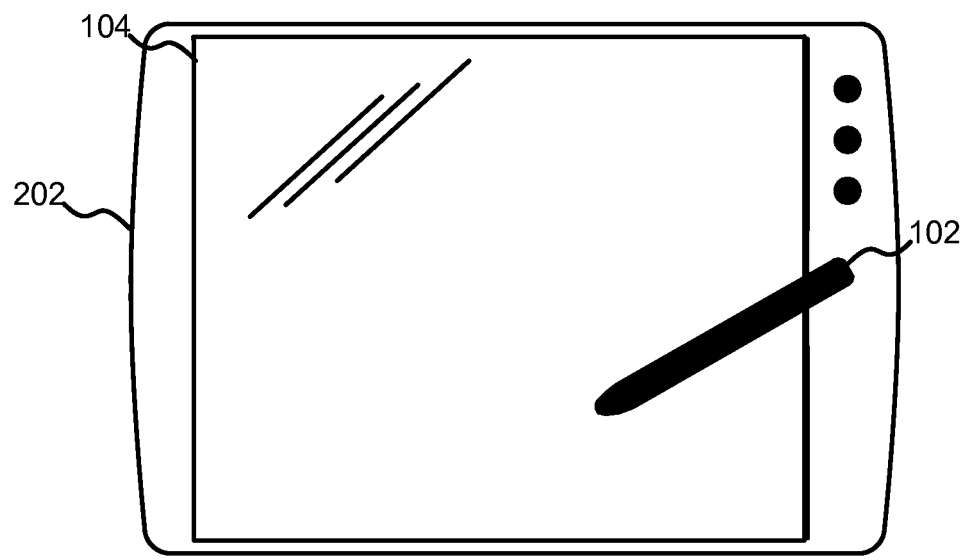
FIG. 2A is a schematic diagram illustrating another embodiment of a system to regenerate H-sync by a touch controller.
Figure 2B:
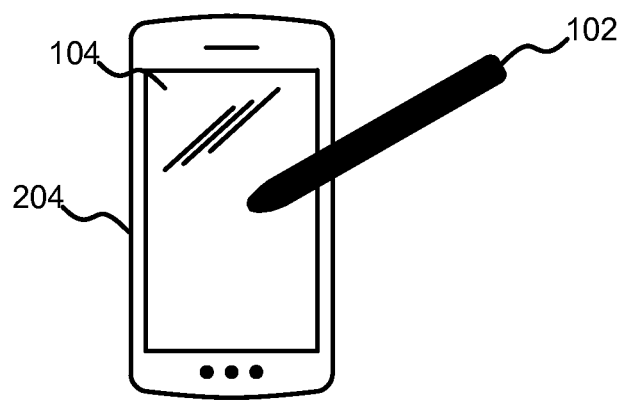
FIG. 2B is a schematic diagram illustrating another embodiment of a system to regenerate H-sync by a touch controller.
Figure 2C:
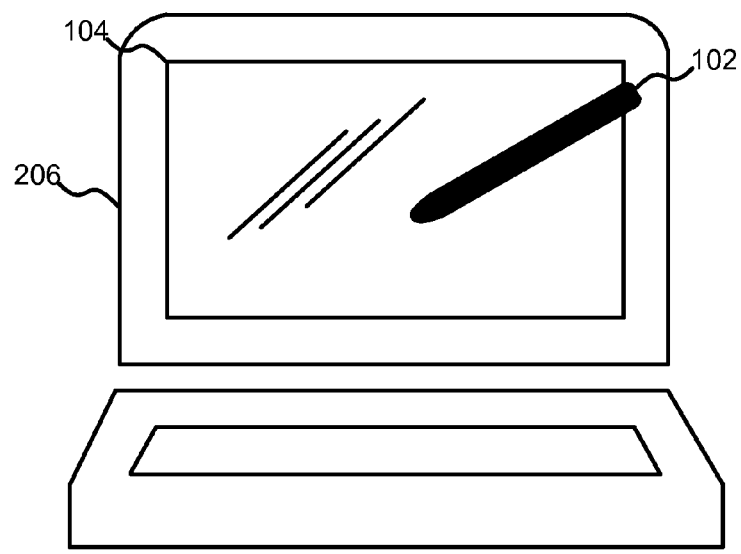
FIG. 2C is a schematic diagram illustrating another embodiment of a system to regenerate H-sync by a touch controller.
Figure 2D:
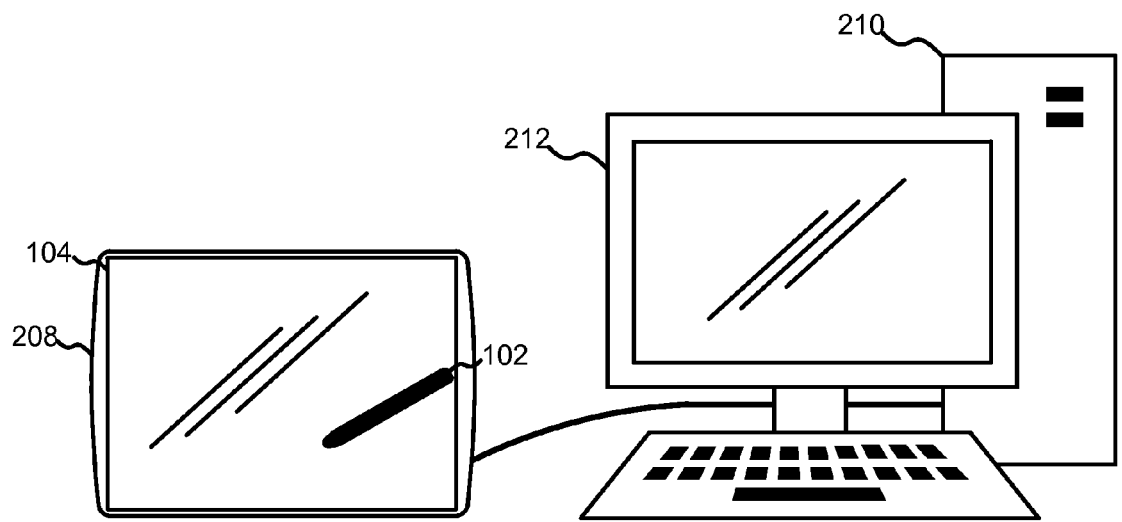
FIG. 2D is a schematic diagram illustrating another embodiment of a system to regenerate H-sync by a touch controller.

FIGS. 2A-D illustrate examples of systems in which the present embodiments may be used. FIG. 2A illustrates a tablet device 202 which has a touch-sensitive display device 104 and an active digitization device 102, such as an active pen or active stylus, which may be configured to communicate with the tablet device 202. FIG. 2B illustrates a smartphone device 204 with a display 104 and an active digitization device 102. FIG. 2C illustrates a laptop computer 206 with a display 104 and an active digitization device 102. In some embodiments, the display 104 of the laptop computer 205 may be touch-sensitive. FIG. 2D illustrates yet another embodiment comprising a desktop computer 210 with a computer monitor 212. An active digitizer pad or tablet 208 may be coupled to the desktop computer 210. In an embodiment, the active digitizer tablet 208 may also include a display 104. FIG. 2D also includes an active digitizer device 102, such as an active pen or active stylus. One of ordinary skill will recognize a variety of other suitable active digitizer systems which may be configured for use according to the present embodiments.

Figure 3:
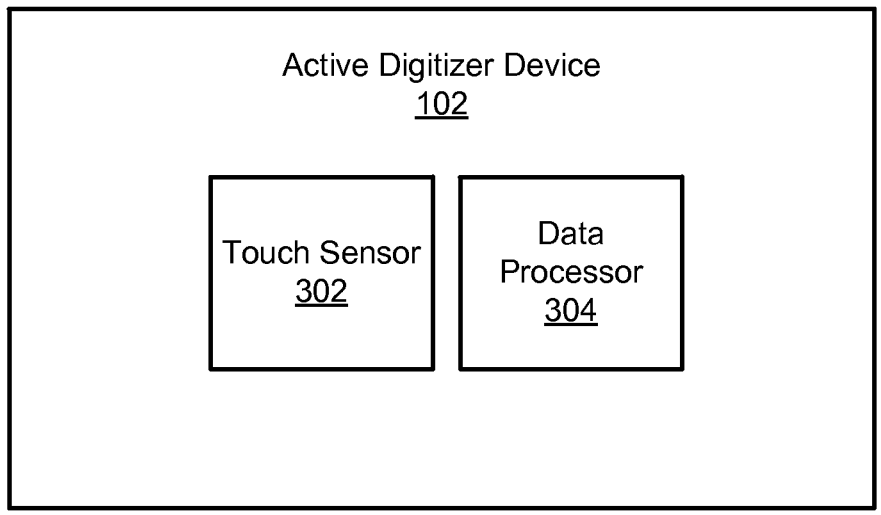
FIG. 3 is a schematic block diagram illustrating one embodiment of an apparatus to regenerate H-sync by a touch controller.

FIG. 3 is a schematic block diagram illustrating one embodiment of an apparatus to regenerate H-sync by a touch controller. In an embodiment, the apparatus is an active digitizer device 102. The active digitizer device 102 may include a touch sensor 302 and a data processor 304. The touch sensor 302 may detect the noise generated by the display device 104 and convert the noise into a noise signal 106. The data processor 304 may receive the noise signal 106 from the touch sensor and set the noise peak threshold 108 such that the H-sync pulse peaks 110 may be detected and separated from other noise generated by the display device 104. Then data processor 304 may also determine a frequency of the noise peaks 110 that exceed the noise peak threshold 108, and select an H-sync signal for regeneration by referencing a lookup table of H-sync signals with reference to the determined frequency of the noise peaks 110 that exceed the noise peak threshold 108.

Figure 4:
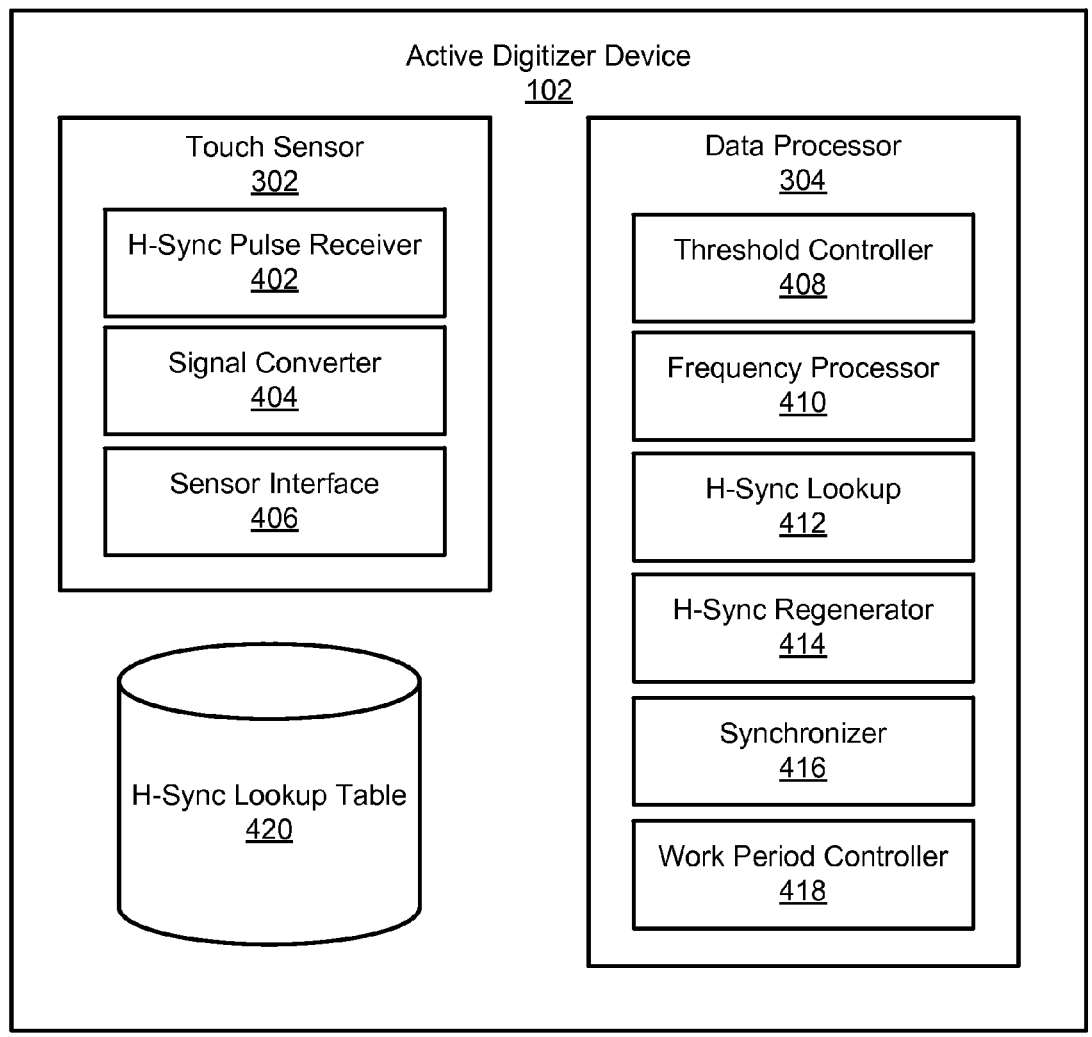
FIG. 4 is a schematic block diagram illustrating another embodiment of an apparatus to regenerate H-sync by a touch controller.

FIG. 4 is a schematic block diagram illustrating another embodiment of an apparatus to regenerate H-sync by a touch controller. In an embodiment, the active digitizer device includes the touch sensor 302 and the data processor 304 as described above. The touch sensor 302 may be an electromagnetic sensor device comprising an inductive element, or the like. The touch sensor 302 may further include an H-sync pulse receiver 402 configured to receive the noise peaks 110 that exceed the threshold 108, a signal converter 404 configured to convert the received noise into electrical signals suitable for processing by the data processor 304. For example, the signal converter 404 may include an analog to digital converter, or the like. The touch sensor 302 may further include a sensor interface 406 configured to communicate the generated noise signal 106 to the data processor 304.

In an embodiment, the data processor 304 may further include a threshold controller 408. The threshold controller 408 may be configured to monitor a noise floor generated by the display device and determine a value for the noise threshold 108 that allows the data processor 304 to differentiate the H-sync pulse peaks from other noise generated by the display device 108. The threshold controller 408 may be configured to apply the threshold 108 using one or more digital or analog filters. The frequency processor 410 may be configured to determine the H-sync frequency in response to the noise peaks 110 that exceed the threshold 108. For example, the frequency processor 410 may run one or more transforms, such as Laplace transforms, on the detected peaks 110 in the noise signal 106 to determine the H-sync frequency.

Once the H-sync frequency is determined, the H-sync lookup 412 may reference an H-sync lookup table 420 to identify a function that may be used by the H-sync regenerator 414 to regenerate the H-sync signal. In an embodiment, the synchronizer 416 may synchronize the working period of the active digitizer device 102 with the regenerated H-sync signal such that the working period of the active digitizer device 102 avoids time periods in which H-sync pulses are present in the noise field. The work period controller 418 may then set the work period of the active digitizer device according to the synchronization.

One of ordinary skill will recognize that an active digitizer device may include more or fewer components, and may perform the same function in more or fewer steps. For example, an active digitizer device 102 may include additional sensor devices, such as gyroscopes, accelerometers, pressure sensors, etc. Also, one of ordinary skill will recognize that certain steps may be omitted, for example, the work period may be matched to the H-sync signal without completely regenerating the H-sync signal, in some embodiments.

Figure 5:
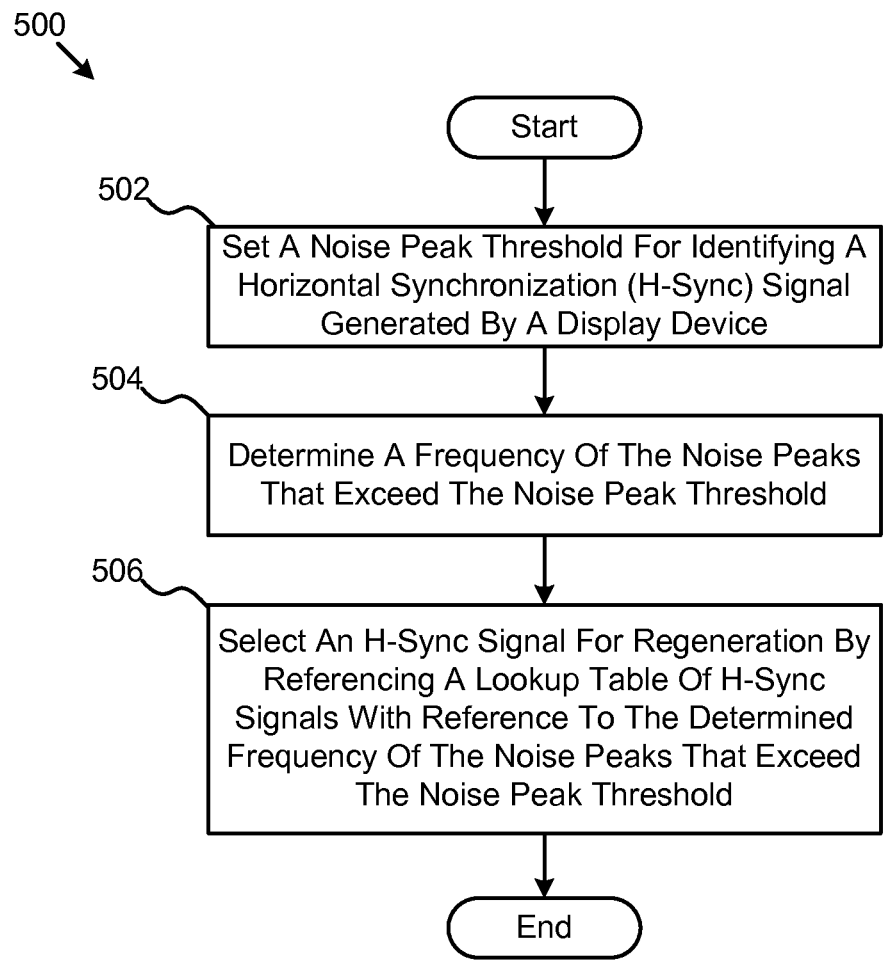
FIG. 5 is a schematic flowchart diagram illustrating one embodiment of a method to regenerate H-sync by a touch controller.

FIG. 5 is a schematic flowchart diagram illustrating one embodiment of a method 500 to regenerate H-sync by a touch controller. In an embodiment, the method 500 starts at block 502, by setting a noise peak threshold for identifying an H-sync signal generated by a display device. At block 504, the method 500 includes determining a frequency of the noise peaks that exceed the noise peak threshold. Next, at block 506, the method 500 includes selecting an H-sync signal for regeneration by referencing a lookup table of H-sync signals with reference to the determined frequency of the noise peaks that exceed the noise peak threshold.

Figure 6:
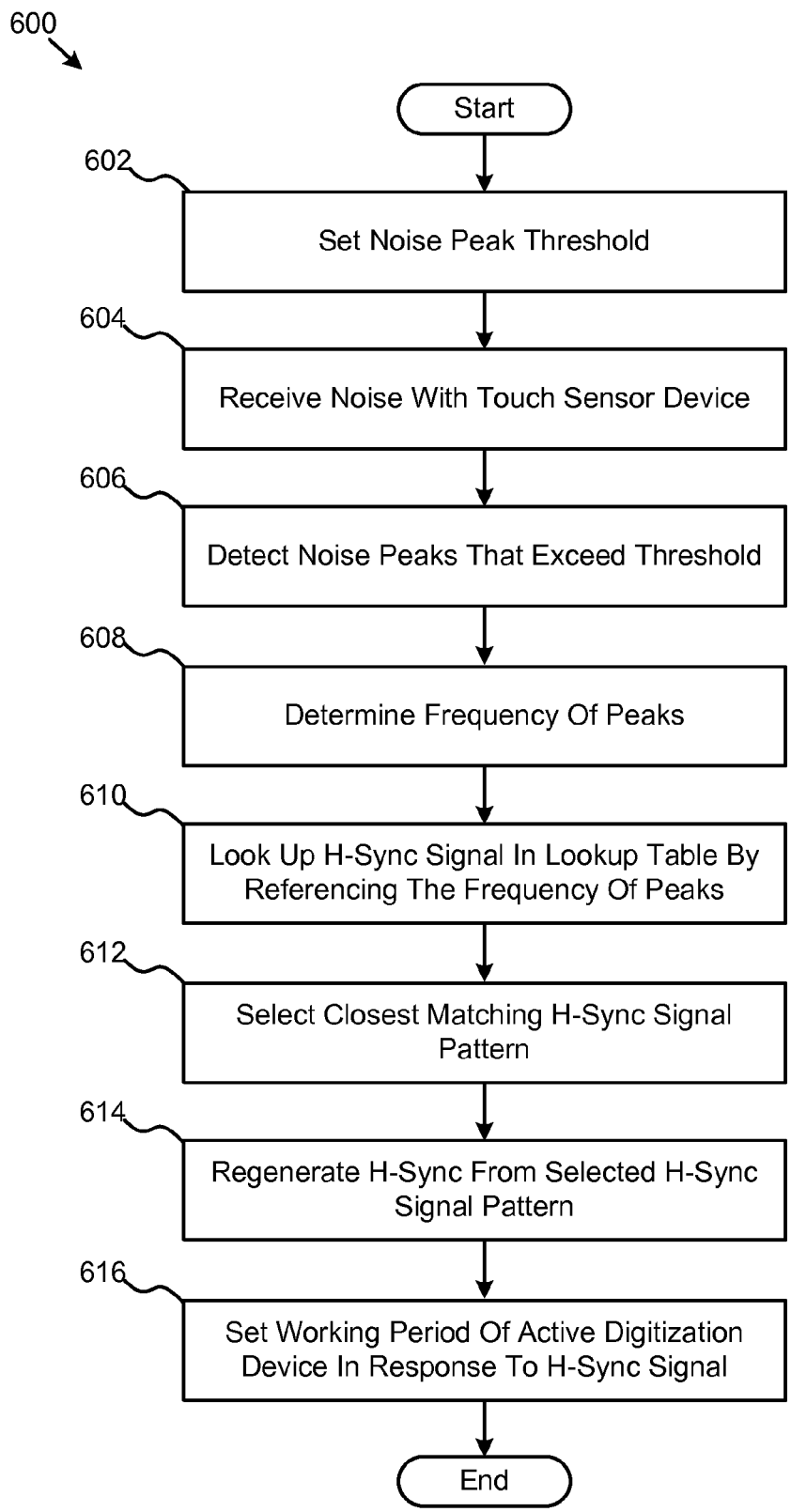
FIG. 6 is a schematic flowchart diagram illustrating another embodiment of a method to regenerate H-sync by a touch controller.

FIG. 6 is a schematic flowchart diagram illustrating another embodiment of a method 600 to regenerate H-sync by a touch controller. The method 600 may include setting a noise peak threshold 108, as shown at block 602. The touch sensor device 302 may then receive noise from the display device 104 as shown at block 604. The data processor 304 may then detect noise peaks 110 that exceed the threshold 108 as shown at block 606. At block 608, the data processor 304 may then determine the frequency of the peaks 110. The data processor 304 may further lookup an H-sync signal in a lookup table 420 by referencing the frequency of the peaks as shown at block 610. The data processor 304 may select the closest matching H-sync signal pattern from the lookup table 420 at block 612, and then regenerate the H-sync signal from the H-sync signal pattern as shown at block 614. The data processor 304 may then set the working period of the active digitization device 102 in response to the H-sync signal at block 616. One of ordinary skill will recognize that more or fewer steps may be included in the method 600. For example, step 614 of regenerating the H-sync signal from the selected H-sync signal pattern may be omitted in some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:

setting, using a processing device, a noise peak threshold for identifying a Horizontal Synchronization (H-Sync) signal generated by a display device;

determining, using the processing device, a frequency of noise peaks of noise generated by the display device that exceed the noise peak threshold; and selecting, using the processing device, an H-sync signal for regeneration by referencing a lookup table of H-sync signals with reference to the determined frequency of the noise peaks that exceed the noise peak threshold.

2. The method of claim 1, further comprising receiving noise from the display device with a touch sensor.

3. The method of claim 2, further comprising converting the noise received by the touch sensor into a noise signal.

4. The method of claim 1, further comprising regenerating the selected H-sync signal.

5. The method of claim 1, further comprising synchronizing an active pen device with the selected H-sync signal.

6. The method of claim 5, wherein synchronizing the active pen device further comprises determining a working period for the active pen device in response to the selected H-sync signal.

7. The method of claim 6, wherein synchronizing the active pen device further comprises setting the working period for the active pen device to the time period between H-sync pulses defined by the selected H-sync signal.

8. An apparatus, comprising:
a touch sensor configured to receive noise from a display device; and
a processing device coupled to the touch sensor, the processing device configured to:
set a noise peak threshold for identifying a Horizontal Synchronization (H-Sync) signal generated by a display device;
determine a frequency of noise peaks of the noise received from the display device that exceed the noise peak threshold; and
select an H-sync signal for regeneration by referencing a lookup table of H-sync signals with reference to the determined frequency of the noise peaks that exceed the noise peak threshold.

9. The apparatus of claim 1, wherein the touch sensor is further configured to convert the received noise into a noise signal.

10. The apparatus of claim 1, wherein the processing device is further configured to regenerate the selected H-sync signal.

11. The apparatus of claim 1, wherein the processing device is further configured to synchronize with the selected H-sync signal.

12. The apparatus of claim 11, wherein the processing device is further configured to determine a working period in response to the selected H-sync signal.

13. The apparatus of claim 12, wherein the processing device is further configured to set the working period to the time period between H-sync pulses defined by the selected H-sync signal.

14. A system, comprising:
a display device having a predetermined Horizontal Synchronization (H-Sync) period, the H-sync comprising a plurality of H-sync pulses; and
an active pen device configured to interact with the display device, the active pen device comprising:
a touch sensor configured to receive noise from the display device; and
a processing device coupled to the touch sensor, the processing device configured to:
set a noise peak threshold for identifying a Horizontal Synchronization (H-Sync) signal generated by the display device;
determine a frequency of noise peaks of the noise received from the display device that exceed the noise peak threshold; and
select an H-sync signal for regeneration by referencing a lookup table of H-sync signals with reference to the determined frequency of the noise peaks that exceed the noise peak threshold.

15. The system of claim 14, wherein the touch sensor is further configured to convert the received noise into a noise signal.

16. The system of claim 14, wherein the processing device is further configured to regenerate the selected H-sync signal.

17. The system of claim 14, wherein the processing device is further configured to synchronize with the selected H-sync signal.

18. The system of claim 17, wherein synchronizing the active pen device further comprises determining a working period for the active pen device in response to the selected H-sync signal.

19. The system of claim 18, wherein synchronizing the active pen device further comprises setting the working period for the active pen device to the time period between H-sync pulses defined by the selected H-sync signal.

20. The method of claim 1, further comprising separating the noise peaks corresponding to the H-sync signal from other noise of the noise generated by the display device.

* * * * *